United States Patent [19]
Briosi

[11] Patent Number: 4,709,642
[45] Date of Patent: Dec. 1, 1987

[54] SIMPLIFIED METALLIC STRUCTURES AND PROCEDURE FOR THEIR PRODUCTION

[76] Inventor: Antonello Briosi, V.le del Lavoro, 3, 38068 Rovereto, Italy

[21] Appl. No.: 782,209

[22] Filed: Sep. 30, 1985

[51] Int. Cl.[4] .......................... A47B 3/00; A47F 5/00
[52] U.S. Cl. ..................................... 108/111; 211/135
[58] Field of Search ................ 108/111; 211/135, 187, 211/153; 312/264, 265, 257 SM; 403/381; 248/244, 245, 247, 246, 248; 52/588, 586, 286, 289

[56] References Cited

U.S. PATENT DOCUMENTS

| | | | |
|---|---|---|---|
| 1,676,930 | 7/1928 | Schmitz | 211/135 |
| 2,501,980 | 3/1950 | Wolfe | 312/265 X |
| 2,774,609 | 12/1956 | Winger | 403/381 X |
| 3,047,264 | 7/1962 | Terry | 248/247 X |
| 3,489,291 | 1/1970 | Frazier | 248/245 X |
| 3,556,309 | 1/1971 | Schreyer | 211/153 |
| 4,025,215 | 5/1977 | Murdock et al. | 403/381 |
| 4,047,777 | 9/1977 | Pfeefer et al. | 52/586 X |
| 4,062,302 | 12/1977 | Krizan | 211/135 X |
| 4,173,934 | 11/1979 | Searby | 108/111 |
| 4,236,460 | 12/1980 | Poupko | 108/111 X |

FOREIGN PATENT DOCUMENTS

| | | | |
|---|---|---|---|
| 251978 | 6/1964 | Australia | 52/588 |
| 1355460 | 2/1964 | France | 52/588 |

Primary Examiner—Kenneth J. Dorner
Assistant Examiner—José V. Chen
Attorney, Agent, or Firm—Bucknam and Archer

[57] ABSTRACT

Simplified metallic structures, in particular shelving, consisting of shelves and uprights, made of relatively thin sheet metal and complete with projections and of fixing members consisting of plastic angular components arranged in the space defined between the uprights and the shelves and with cavities where the projections of the shelves and the uprights are inserted.

The uprights may have the same shape and dimensions of the shelves, or may have smaller dimensions and have a transverse section corresponding to that of the cavity. A hole is made in the angular components where the fixing and anchoring tie-rods are inserted.

3 Claims, 10 Drawing Figures

SIMPLIFIED METALLIC STRUCTURES AND PROCEDURE FOR THEIR PRODUCTION

BACKGROUND OF THE INVENTION

1. Field of the Invention

This invention refers to metallic structures and to the procedure for their embodiment.

More in particular, this invention refers to modular structure metallic shelvings and to the procedure for their embodiment.

2. Description of the Prior Art

Modular structure metallic shelvings are well known and are used in different fields, as supporting members for bodies, objects, books, mechanical parts and loads in general, even when they are of considerable weight. The shelving structures generally consist of a series of shelves, supported and fixed to uprights. Screws, bolts, angular members, etc. are used to fix the said shelves.

Due to the different function to which the shelves and the uprights are destined, they are made using sheet metal of a different thickness.

This involves both a waste of material and a greater stock of sheet metal, subsequently tying-up capital.

Furthermore, to guarantee that the shelving structure has adequate stability and rigidity it is necessary to ensure that the screws are properly tightened.

This operation, besides requiring a certain time is not without drawbacks for the operator who must often resort to using protective gloves to avoid scratches, or injury to the hands.

SUMMARY OF THE INVENTION

According to this invention, all the drawbacks described above are overcome using a metallic structure, in particular shelving, that includes shelves and uprights which are rigidly connected to one another via fixing means, where the shelves and the uprights are realized using thin sheet metal and have "under-bracket" folds, and the fixing means consist of T-square plastic angular components the wings of which adhere to the shelf and the upright respectively and have longitudinal and transverse cavities with a transverse cross-section corresponding to that of the "under-bracket" folds of the said shelves and uprights; the said folds being inserted in the said cavities.

According to this invention, the prevalent metallic structures are made using relatively thin sheet metal strips and processed in a sequence of stages during which the starting material, in particular, a metal coil, undergoes numerous folds, in order to materialize the so-called "under-bracket", preferably dove tailed. When shaped, the said sheet metal is combined with the fixing members which in turn are shaped and made of polymeric material, these members materialising the "corners", preferably but not critically at 90°, between the shelves and the up-rights which form the overall prevailently metallic structure.

One of the essential characteristics of the invention is the processing of the starting material (which for the sake of simplicity will hereinafter be defined as "relatively thin sheet metal"), processing which forms, obviously in different orientations, both the "shelves" and the "uprights" of the shelving structure in its complete three-dimensional structure using the same sheet metal.

More particularly, the shelving structure is made up of properly definable "modular" members, since the complete shelving is produced with portions of processed material, having the pre-selected dimensions to form both the shelves and the uprights, naturally and depending on the fact that the processed members are essentially horizontal, or vertical respectively.

Obviously, the "modularity" does not imply dimensional limitations, but above all refers to the repeatability of certain dimensions. For example, the shelves may be realized with the longitudinal dimensions being compatible with the capacity of the room in which the shelving must be installed. Similarly, the uprights will be limited in their height and similar vertical space requirements.

Another essential characteristic of this invention are the fixing members, consisting of angular components arranged where the connections are made between the shelves and uprights. Preferably, the angular components have longitudinal holes and a tie-rod is inserted into the said hole to tighten the angular components around the projections, in particular, dove tail type, formed when processing the sheet metal.

These projections, preferably dove tail, may be geometrically different, for example "T" shape, or however of the most convenient geometric shapes to satisfy the requirements of the shelvings, i.e. to withstand even considerable weights and loads. This requirement mainly interests the case of the shelvings for principally industrial use, for example, in the formation of shelvings for the orderly arrangement of spare parts, tools and other items.

The angular components are produced in order to include geometrically coherent cavities with the said dove tail projections in their perpendicular sections to the shelves and/or the uprights so that tightening of the angular components leads to anchoring the latter in their desired position, or positions along the associated shelf and/or upright.

The angular components include lightened sections to achieve the elastic deformability of the components and the hole pre-arranged for the passage of the tie-rod is foreseen so as not to intercept the projections of the shelves and/or uprights respectively inserted in the cavities.

Furthermore, the cross-sections of the angular components have a geometry that permits their elastic deformation, under the tightening effect of the above mentioned tie-rods, and are suitably fitted with threaded parts working together with nuts.

It is clear that the use of the said angular components eliminates the present need to use uprights, drilled pieces, supporting "longitudinal members" of the shelves and other well known limitations in the art of the sector. According to this invention, the uprights may have the same shape and dimension as the shelves or they may have relatively reduced dimensions and cross-sections and in practice, corresponding to the geometric characteristics of the cavity of the angular components.

According to this last embodiment, the uprights are positioned relatively close together and distributed in an orderly way in the dimension occupied in the horizontal direction of the shelves, to contribute in supporting the objects, for example, books on the shelves of the shelving structures.

The uprights, always with a relatively reduced cross-section, are inserted in the space defined by the horizontal dimensions of the angular components; more specifically the uprights are distributed in the central area of the shelving structure and more precisely inserted in the cavities of the angular components.

Preferably, the uprights project beyond the upper angular component of the coherent shelf, to contribute to the support of the objects, as for example books, placed on the shelf of the shelving structure.

In addition, the shelving may be completed by uprights arranged at the sides of the shelving structure. The shelving structure realised in this way has no uprights that completely hide the content of the various shelves and is obtained with a considerable saving of metal.

The uprights may be completed with plastic lined edges along their lower and upper ends, to realized a resting base against the ground, especially on particularly delicate flooring and a terminal edge which, for example, may be set against the ceiling of the room, in which the shelving, must be installed without causing any damage. The simplified shelving, subject of this invention, may be used not only in the industrial field, but also in the field of furnishing, furniture and similar activities. For example, with the shelvings according to the invention, it is possible to realise three-dimensional structures, for libraries and furniture in general, complete with a desired number of shelves, arranged as required in the various cases. Whereas, for the production of shelving for a prevalent industrial use, the surface of the metallic structure may be that of the starting material, (zinc, or galvanised sheet metal) for shelving prevailently destined to form furnishing articles, furniture or other items, the surfaces of the metallic structure may be coloured, lined with different material, upholstery and other forms, all depending on the requirements and/or architectural and interior design conveniences. It is found preferable for the edges of the shelves and/or uprights to be rounded via a "curled" curvature to make them easier to handle during assembly and when positioning the shelving structure.

BRIEF DESCRIPTION OF THE DRAWINGS

To better appreciate the structural and functional characteristics of this metallic structure a detailed description of the said structure will be provided here with reference to the attached drawings that illustrate a preferred, exemplificative, but non-limitative embodiment of this invention and where.

DESCRIPTION OF THE PREFERRED EMBODIMENTS

Figure 1:
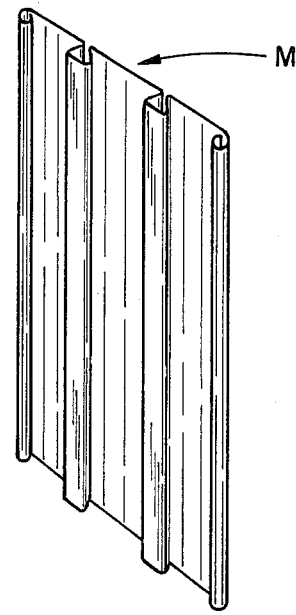
FIG. 1 represents the perspective view of a modular member according to an embodiment of this invention, that may be used both as a shelf and an upright.

FIG. 1, in an exemplificative and non-limitative form, shows a modular metallic member M having a relatively limited thickness, complete with preferably dovetail projections. The member, associated with other angular components described later may be used indifferently to form either the shelves, or the uprights of a shelving structure.

Figure 2:
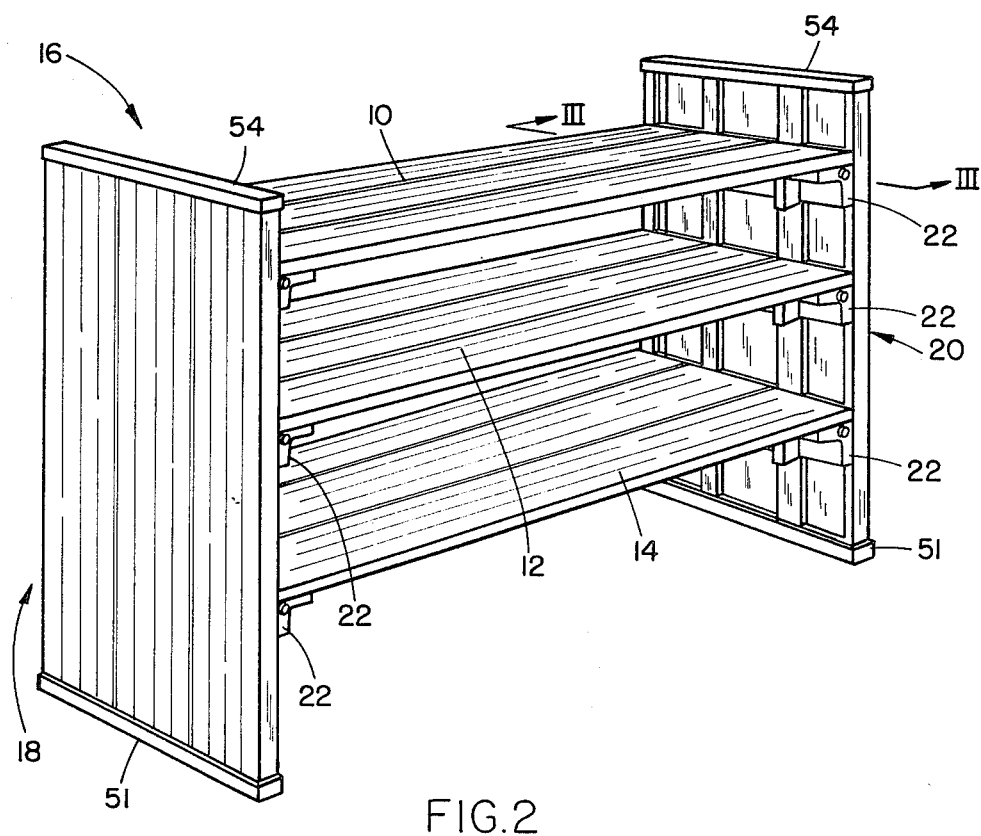
FIG. 2 represents a perspective view of an embodiment of this shelving structure made up of numerous modular members of FIG. 1 fixed using the modular components that are a characteristic of the invention.

FIG. 2, in an exemplificative, non-limitative form illustrates for example, but not critically, shelving for industrial applications, such as to fit a warehouse to maintain (so-called "storage") of one, or several supplies of spare parts and other products, or articles, generally metallic and having a significant weight. Hence, a primary requirement of a shelving structure for the uses indicated, or equivalent is that of having a significant mechanical and weight-carrying capacity, despite the fact that the shelving is realized with numerous, members M of relatively thin sheet metal, for example, having a thickness of about one millimetre, or even less. The sheet metal forming the modular members M may be of steel, zinc, or other materials.

Besides the example described above to form shelving structures for use in libraries and however to furnish rooms, the members M may be entirely visible, i.e. maintaining the characteristics of the starting material, or may be coated wtih paint, varnish, etc. to protect them from being effected, for example due to humidity, as well as to improve their aesthetics and/or to facilitate recognition of the products arranged selectively on the different shelves.

The shelving structure illustrated in the example of FIG. 2 identified overall by 16, is made up of numerous members M and, for example, includes three shelves 10, 12 and 14.

The shelving 16, has at least two "uprights" indicated individually by 18 and 20 to support the said shelves 10, 12 and 14, the uprights support the ends of the shelves by means of characteristic angular components each one of which, as a function of their essential conceptual and positional nature, is indicated by 22.

These characteristic angular components 22 are produced preferably using polymeric material, even if any other material may be used, provided it has sufficient mechanical resistance albeit within given elasticity limits.

The said angular components 22 occupy the three-dimensional space defined between the uprights 18, 20 and the shelves 10, 12, 14.

Figure 5:
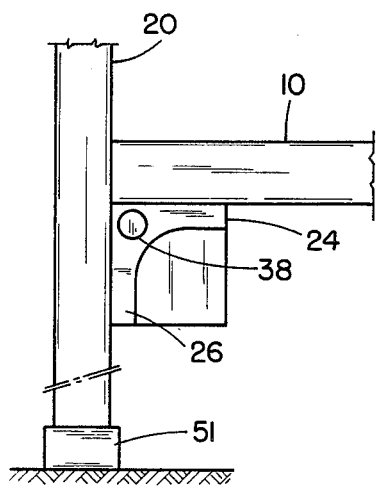
FIG. 5 represents a front view of one of the characteristic angular components, viewed in the direction indicated by V in FIG. 3.
Figure 6:
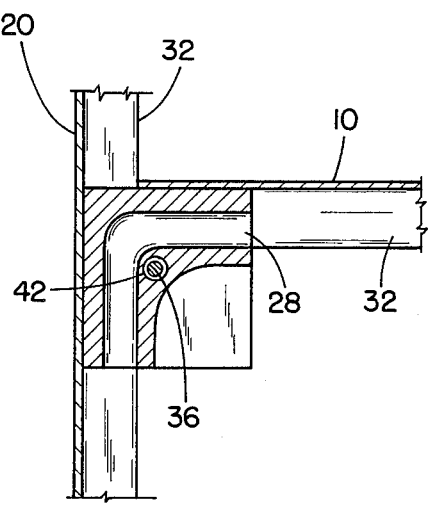
FIG. 6 represents the cross-section of the angular component of FIG. 5 in the plane indicated by VI—VI in FIG. 3.
Figure 7:
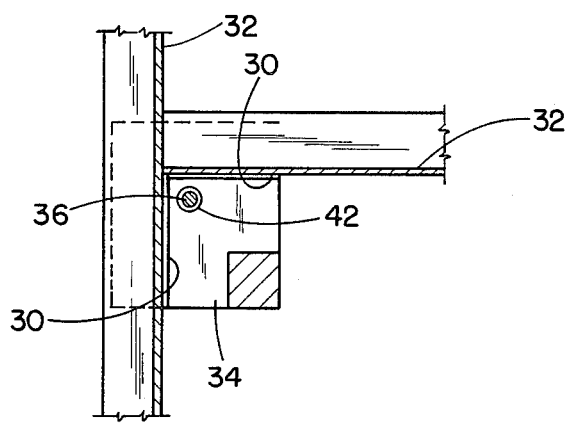
FIG. 7 represents the cross-section of the angular component of FIG. 5 in the plane and in the direction indicated by VII—VII in FIG. 3.

More precisely, these angular components 22 have "wings" 24 and 26 (see FIGS. 5 and 6) in their essentially rigid structure (neglecting the elastic deformability) the first of these wings 24 being virtually identified with shelf 10 which rests on top of it, while the second wings 26 contrast with the adjacent upright 20.

The said angular components 22 are lightened by empty portions 28 and have cavities 30 corresponding to both wings 24 and 26 forming a female part to suitably receive coherent projections 32 with a "dove-tail" cross-section, or equivalent geometry critically capable of forming an "under-bracket", formed in both the uprights 18, 20 and in the shelves 10, 12 and 14. The cavities 30 made along wing 24, are co-planar with those made along wing 26, even if in a direction perpendicular to each other.

The cavities 30 have slots 34 which provide the angular component 22 with a given elastic deformability when subjected to compression in a direction longitudinal to the edge materialized by it. The consequent elastic deformation is exploited to "anchor" the projections 32 of both the shelves 10-14 and the uprights 18-20 and to fix the same projections inside the cavities 30 and hence make the shelving stable.

The angular components 22 have a longitudinal through hole 42 into which a tie-rod 36 is inserted, to achieve this tightening, or anchoring effect, the said tie-rod has an enlarged head at one end 38 and at least one nut 40 at the other.

The holes 42 pass through the angular components 22 in the direction of the greatest dimension and are prearranged in order not to intercept the projections 32 inside the cavities 30.

By using the angular components 22 it is possible to utilize the modular members M indifferently in the assembly of shelving structures either as shelves, or as uprights, adoptable as such in their spacial orientation.

These modular members M may be produced by processing a flat, or virtually flat metal, for example by straightening sheet metal supplied in coils.

Figures 3, 4:
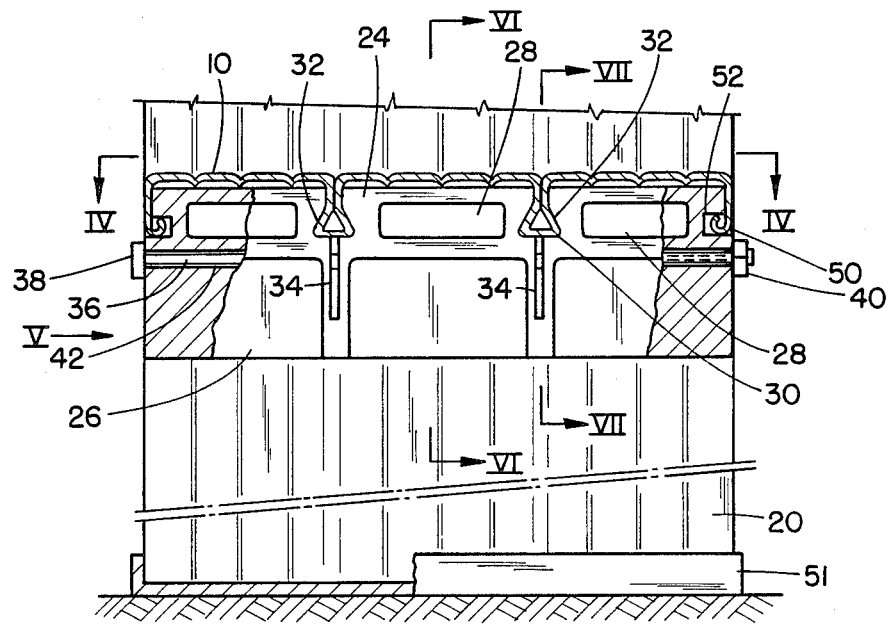
FIG. 3 represents a cross-section of the exemplificative shelving of FIG. 2, with parts partially in view and parts partially in cross-section in the plane and in the direction indicated by III—III in FIG. 2.
FIG. 4 represents a cross-section of the shelving of FIG. 2, with parts partially removed, taken in the plane and in the direction indicated by IV—IV in FIG. 3.
Figure 10:
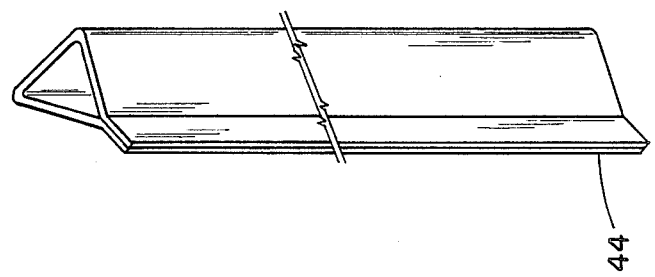
FIG. 10 represents the perspective view of one of the uprights for the embodiment of the shelving of FIG. 8.

The edges of the modular sheet metal members M are preferably rounded into a "curl" 50 (FIGS. 3 and 4) to remove the "sharpness" from the edges and make for easier handling of the materials. The curled edges 50 are inserted in seats 52 foreseen in the "wings" 24, 26 of the angular components 22 so that connection and anchoring between the uprights and shelves leaves no roughness on the outside of the connection itself. The members 18 and 20 (in the case illustrated in FIG. 2) with upright structural functions have terminal edges 51 and 54 at their lower and/or upper ends respectively, to form a floor resting base and where required, an end to contrast with the ceiling where the shelving is installed. Another embodiment form of this invention is illustrated in FIGS. 8-10, where numerous uprights are used, indicated individually by 44 and with their upper extremities projecting beyond the upper shelf 10 of the complete shelving, or library 16.

The shelves 10, 12 and 14 (and possibly other necessary members) are connected to the different uprights 44 via the angular components 22 as described above. As stated above, the angular members 22 have cavities 30 arranged along the wings 24 and 26, the geometry of the wings being coherent with the transverse sections of both the uprights 44 and the projections 32 of the shelves 10, 12 and 14.

The connection between the uprights 44 and the shelves 10, 12 and 14 is achieved by tightening the tie-rod 36 inserted in the holes 42 and tightened via the nut 40, after having positioned the projections 32 in the respective cavities 30.

Figure 8:
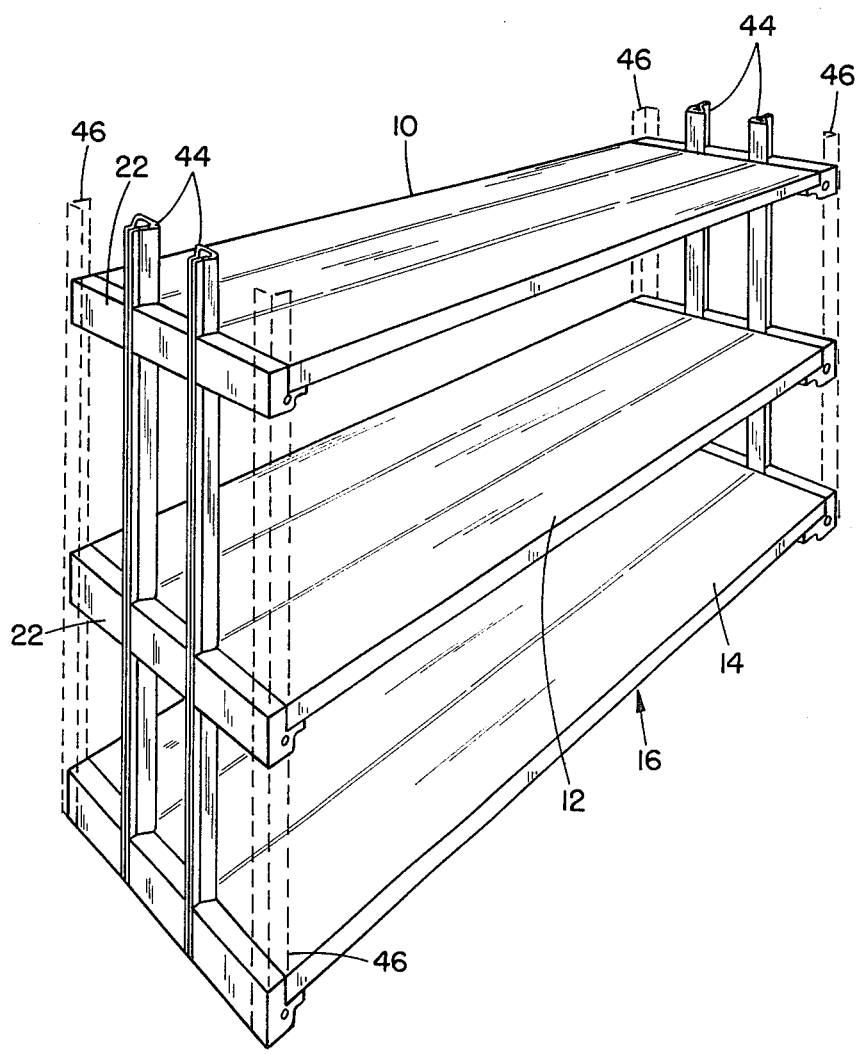
FIG. 8 represents the perspective view of another embodiment of this shelving.
Figure 9:
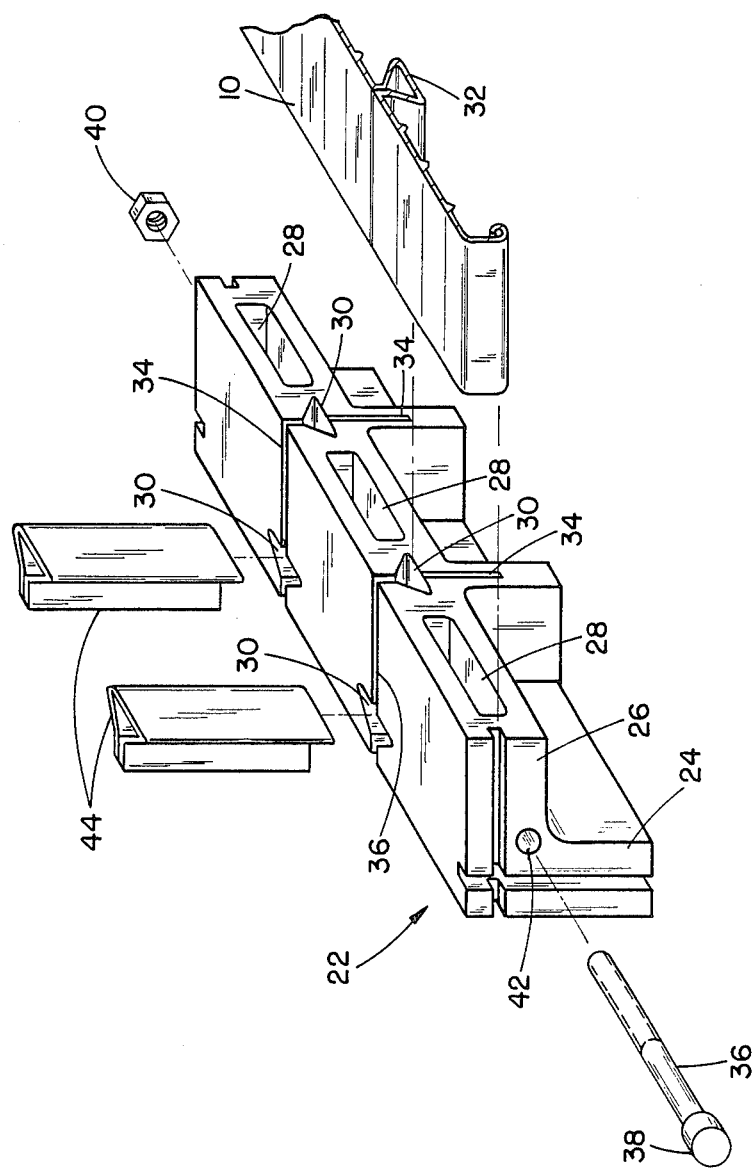
FIG. 9 represents the perspective view of the essential components of the shelving of FIG. 8 associated with one another.

As may be observed in FIG. 8 the uprights 44 are arranged and spaced at a relatively small distance in the relative cavities 30 of the angular component 22, in order to jointly form an equal number of rest and support points for the books present on the shelves naturally when the shelving 16 is utilized as a library.

These uprights 44, their transverse cross-section being relatively small and corresponding to that of the cavity 30, permit the assembly of shelving structures which are light-weight and economic overall, considering the correspondingly reduced use of material for the formation of the complete shelving.

The shelving 16 may be completed by side uprights 46 (represented by a dashed line in the same FIG. 8) arranged at the corners to serve as a protection. While the invention has herein been illustrated by way of detailed embodiments, it will be appreciated that various substitutions, or equivalents may be made without departing from the spirit and scope of the invention as set forth in the following claims.

What I claim is:

1. A shelf structure assembly comprising at least two vertical and at least one horizontal shelf, said vertical supports and said shelf being made of like modular members, said modular members having longitudinal dovetail projections, fixing means for anchoring said shelf to said vertical supports, said vertical supports and said shelf when assembled forming two right angle corners, said fixing means consisting of right angle components located in the corners between said vertical supports and said shelf, said right angle components having two arms, one arm supporting said shelf and the other arm adhering to each of the vertical supports when the shelf structure is assembled, each of said arms having cavities, a slot passing through each arm and into each cavity permitting each cavity to be elastically deformed, the cavities in one arm being perpendicular to the cavities in the other arm, each of said dovetail longitudinal projections having ends, said ends being anchored in said cavities when the shelf structure is assembled, said right angle components having longitudinal through-holes along the longest dimension thereof, tie rods being inserted in said through-holes when the shelf structure is assembled, whereby said right angle components are tightened around said projections as each cavity is deformed about each of said projections.

2. The shelf structure assembly according to claim 1 wherein said upright supports and said shelf have curled edges, said arms of the right angle components forming seats for said curled edges.

3. The shelf structure according to claim 1 wherein said tie rods have an enlarged head at one end thereof and a nut at the other end thereof.

* * * * *